(12) United States Patent
Chrapek et al.

(10) Patent No.: US 11,302,293 B2
(45) Date of Patent: Apr. 12, 2022

(54) SYSTEMS AND METHODS FOR OVERLAYS IN AN AUGMENTED AND VIRTUAL REALITY ENVIRONMENT

(71) Applicant: Honeywell International Inc., Morris Plains, NJ (US)

(72) Inventors: David Chrapek, Morris Plains, NJ (US); Michal Kosik, Morris Plains, NJ (US); Sergij Cernicko, Morris Plains, NJ (US); Katerina Chmelarova, Morris Plains, NJ (US)

(73) Assignee: Honeywell International S.R.O., Prague (CZ)

( * ) Notice: Subject to any disclaimer, the term of this patent is extended or adjusted under 35 U.S.C. 154(b) by 0 days.

(21) Appl. No.: 16/950,025

(22) Filed: Nov. 17, 2020

(65) Prior Publication Data

US 2021/0151008 A1    May 20, 2021

Related U.S. Application Data

(60) Provisional application No. 62/937,218, filed on Nov. 18, 2019.

(51) Int. Cl.
*G09G 5/377* (2006.01)
*G06F 3/01* (2006.01)

(52) U.S. Cl.
CPC .............. *G09G 5/377* (2013.01); *G06F 3/012* (2013.01); *G09G 2354/00* (2013.01)

(58) Field of Classification Search
None
See application file for complete search history.

(56) References Cited

U.S. PATENT DOCUMENTS

2018/0278908 A1* 9/2018 Ross ................... G06T 19/006
2021/0142526 A1* 5/2021 Mantyjarvi ........... G06T 19/006

* cited by examiner

*Primary Examiner* — Yi Wang
(74) *Attorney, Agent, or Firm* — Bookoff McAndrews, PLLC

(57) ABSTRACT

According to certain aspects of the disclosure, a computer-implemented method may be used for overlay display. The method may include displaying, by the one or more processors, information in an overlay; determining, by the one or more processors, a field of view of the user based on determining a positioning of the user device; determining, by the one or more processors, whether the overlay meets a minimum visibility criteria based on the positioning of the user device; and displaying, by the one or more processors, a minimum viewable portion of the overlay in the field of view of the user upon determining that the overlay does not meet the minimum visibility criteria.

20 Claims, 7 Drawing Sheets

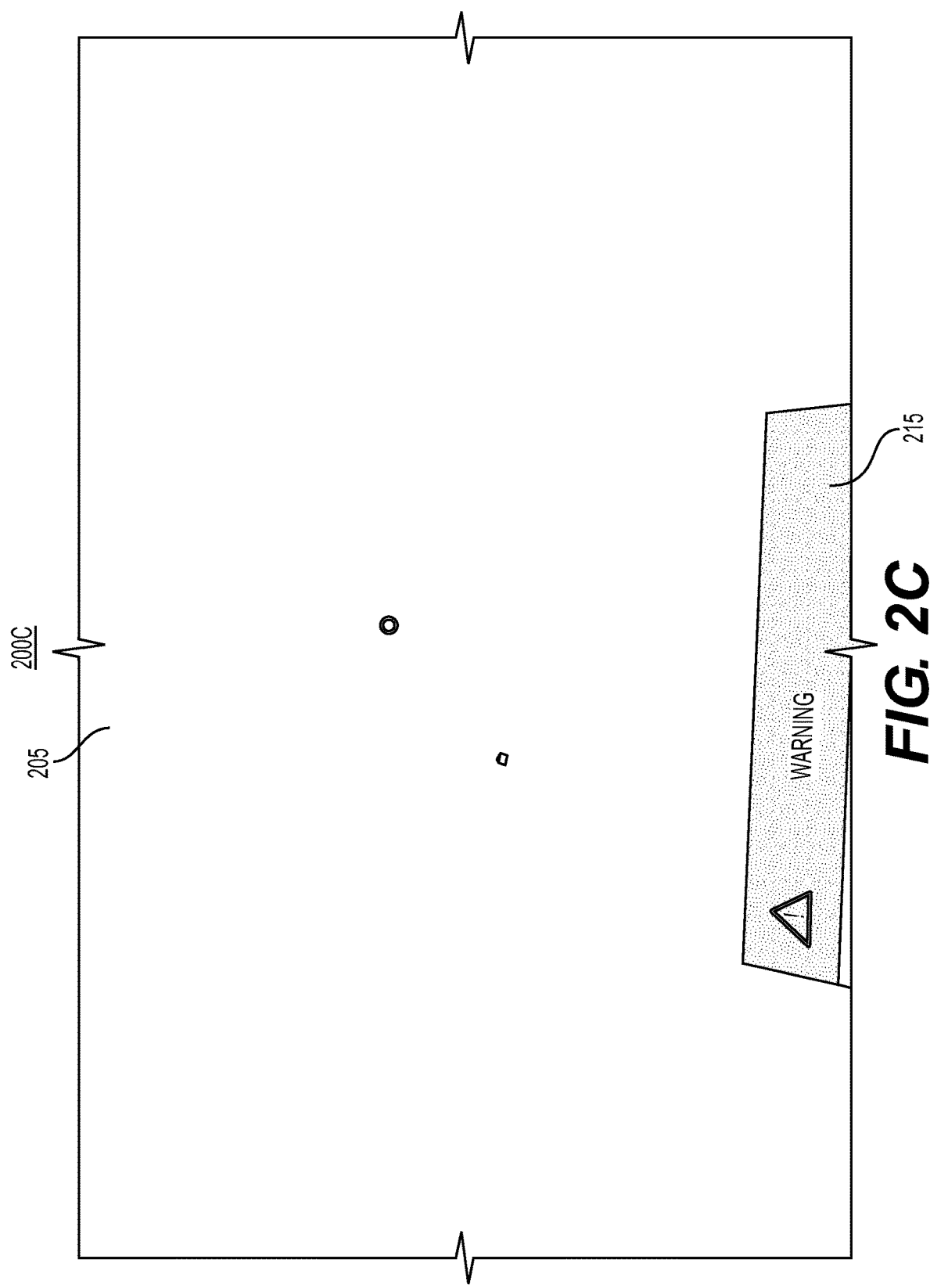

SYSTEMS AND METHODS FOR OVERLAYS IN AN AUGMENTED AND VIRTUAL REALITY ENVIRONMENT

CROSS-REFERENCE TO RELATED APPLICATIONS

This application claims priority to U.S. Provisional Patent Application No. 62/937,218, filed Nov. 18, 2019, which is hereby incorporated by reference in its entirety.

GOVERNMENT CONTRACT

The project leading to this application has received funding from the Clean Sky 2 Joint Undertaking under the European Union's Horizon 2020 research and innovation programme under grant agreement No 686782.

TECHNICAL FIELD

Various embodiments of the present disclosure generally relate to a user interface in a virtual and/or real-world environment and, more particularly, to presenting screens or objects with high importance so as to facilitate attention by a user.

BACKGROUND

In some examples, augmented reality (AR) and virtual reality (VR) systems present information to a user via, for example, a head-mounted screen (on, e.g., glasses, goggles, or a helmet). Such systems may present information such that the information is visible or invisible in undesirable situations. For example, a VR or AR system may present an alert that cannot be cleared by a user, which may interfere with a user's field of view. A VR or AR system may alternatively fail to retain an important alert within a user's field of view.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF DISCLOSURE

According to certain aspects of the disclosure, systems and methods are disclosed to provide overlay screens of high priority information in an augmented and virtual environment.

In one embodiment, a computer-implemented method may be used for overlay screen display. The method includes: displaying, by the one or more processors, information in an overlay; determining, by the one or more processors, a field of view of the user based on determining a positioning of the user device; determining, by the one or more processors, whether the overlay meets a minimum visibility criteria based on the positioning of the user device; and displaying, by the one or more processors, a minimum viewable portion of the overlay in the field of view of the user upon determining that the overlay does not meet the minimum visibility criteria.

In another aspect a computer-implemented system for overlay screen display comprises a memory having processor-readable instructions stored therein; and at least one processor configured to access the memory and execute the processor-readable instructions, which when executed by the processor configures the processor to perform a plurality of functions, including the following method: displaying, by the one or more processors, information in an overlay; determining, by the one or more processors, a field of view of the user based on determining a positioning of the user device; determining, by the one or more processors, whether the overlay meets a minimum visibility criteria based on the positioning of the user device; and displaying, by the one or more processors, a minimum viewable portion of the overlay in the field of view of the user upon determining that the overlay does not meet the minimum visibility criteria.

According to still another aspect of the disclosure, a non-transitory computer-readable medium contains instructions for overlay screen display, the non-transitory computer-readable medium storing instructions that, when executed by at least one processor, may configure the at least one processor to perform the method of: displaying, by the one or more processors, information in an overlay; determining, by the one or more processors, a field of view of the user based on determining a positioning of the user device; determining, by the one or more processors, whether the overlay meets a minimum visibility criteria based on the positioning of the user device; and displaying, by the one or more processors, a minimum viewable portion of the overlay in the field of view of the user upon determining that the overlay does not meet the minimum visibility criteria.

Additional objects and advantages of the disclosed embodiments will be set forth in part in the description that follows, and in part will be apparent from the description, or may be learned by practice of the disclosed embodiments. It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A-2C depict an exemplary user interface of displaying overlay screens in AR/VR environments, according to one aspect of the present disclosure.

DETAILED DESCRIPTION OF EMBODIMENTS

Figure 1:
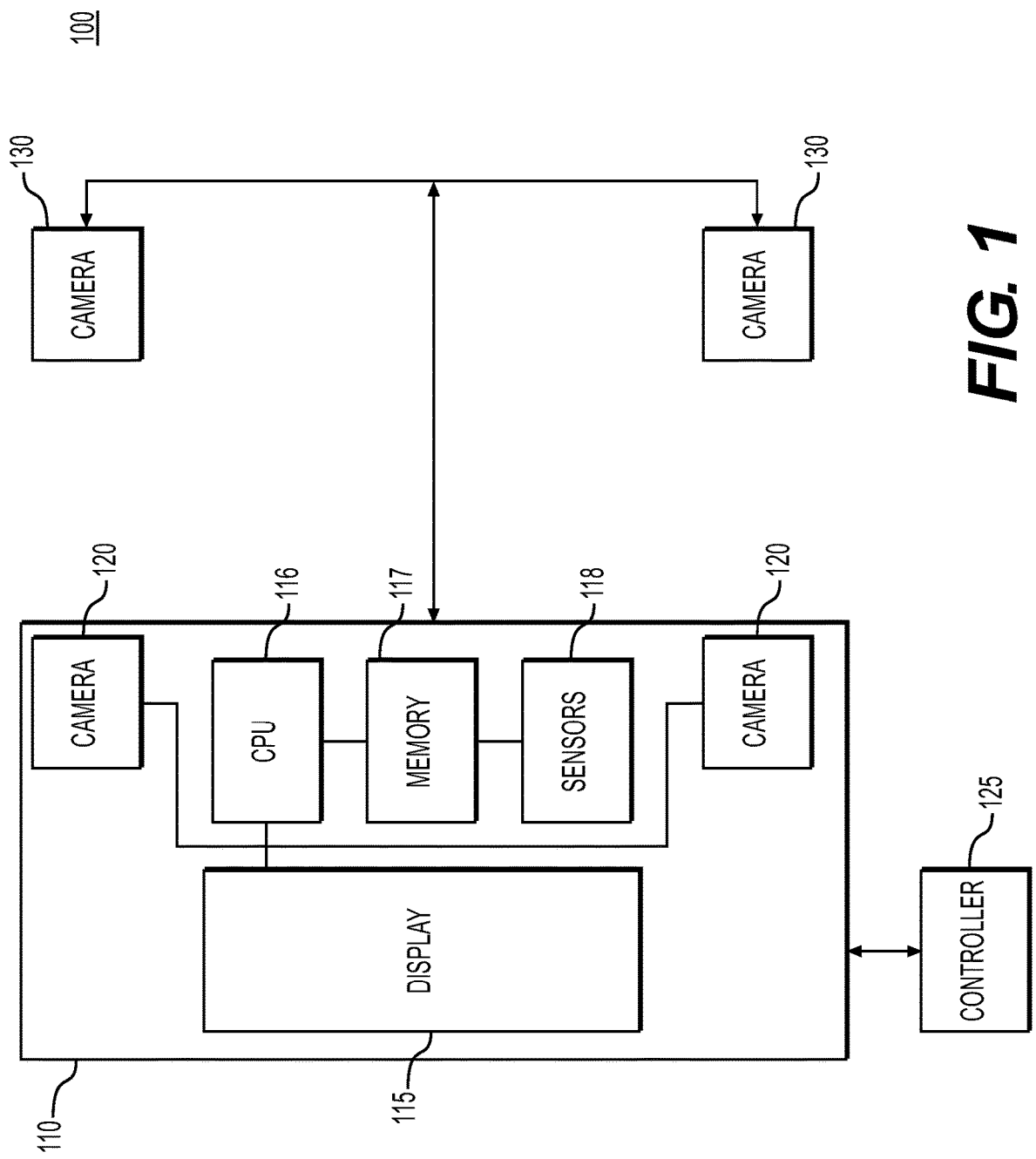
FIG. 1 depicts an exemplary environment in which systems, methods, and other aspects of the present disclosure may be implemented.

As described above, AR and/or VR systems are useful to boost efficiency and safety for individuals operating vehicles and industrial equipment (e.g., employees of a company operating or maintaining vehicles such as aircraft or undergoing training). Although one of AR or VR is referenced in some instances below, the disclosure is not limited to one of AR or VR. Where AR is mentioned, it will be appreciated that VR may also be used, and vice versa. AR is particularly useful to provide information to a user while allowing their hands to remain free to perform tasks, and VR is used during training activities. In examples, AR is used in maintenance, repair, overhaul, inspections, medical procedures, and/or in warehouses. In examples, VR is used for training for the above tasks.

For example, in an industry where employees frequently utilize manuals or instructions, a hands-free AR/VR solution offers efficiency and safety improvements. Hands-free AR/VR solutions offer several options for presenting instructions to the user. In one example, a static head mounted device presents instructions that move with the user, or present instructions as virtual screens or virtual objects positioned in the real world, static relative to the user. In some examples, presenting instructions as screens or objects positioned either in the real world or relative to the user offers a greater amount of information than can be displayed at once since the user finds the information by looking around his or her environment.

Certain AR/VR solutions do not facilitate situations in which the user must continue or finish a current task without interruption. Similarly, certain AR/VR solutions are not sufficient in situations in which high importance or high priority information is desired be displayed to the user until the user takes appropriate actions or the situation that originated the information has ceased. For example, with the type of display that presents instructions that always move with the user (e.g., a headset), an interruption to the user's workflow may arise if information is presented in the front view of the user (and the user cannot move it aside) until the user performs the appropriate actions to dismiss the information. In another example, for a display that presents instructions as screens or objects positioned in the real world, a user's attention or presents instructions as screens or objects positioned relative to the user, a user's attention may not be retained as the user turns away from the information, causing the information to move away from the user's field of view.

Therefore, a need exists for dynamically behaving virtual screens that remain at least partially visible to the user to remind the user of the information, while being instantly accessible or accessible on-demand to the user as a result of the user moving his or her field of view.

The present disclosure provides numerous benefits to the AR/VR environment. For example, the present disclosure provides AR/VR solutions that display important information to users in their field of view when the important information is needed, but also minimize distraction while maintaining visibility of the important information on the periphery of the users' vision when the important information is not needed. Furthermore, the present disclosure allows important information to be constantly presented to the user until the user reacts upon the information, while the user continues or finishes his or her current task without interruption. The present disclosure also increases user efficiency and satisfaction by not forcing the user to interrupt their workflow, and enables the user to postpone an action in response to the information to a more appropriate time. The ease of postponing actions responsive to the information also boosts efficiency and overall safety by clearly reminding the user of the information which requires action.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 depicts an exemplary environment 100 in which systems, methods, and other aspects of the present disclosure may be implemented. Environment 100 includes an AR/VR device 110, an optional controller 125, and external cameras 130. Although two external cameras 130 are depicted, it will be appreciated that any suitable number of external cameras 130 may be used. AR/VR device 110 includes, in at least some examples, a display 115, central processing unit (CPU) 116, memory 117, sensors 118, and one or more internal cameras 120. In examples, AR/VR device 110 is a wearable device, such as smart glasses or a head mounted device (e.g., helmet or visor). In another example, AR/VR device 110 is a mobile device, such as laptop, smartphone, tablet, or other handheld device(s).

In examples, display 115 is transparent such that a user of AR/VR device views an actual environment around the user (not an image of the environment). Such transparent displays are used in, for example, AR headsets or transparent devices (e.g., smart phones and tablets). In other examples, the one or more internal cameras 120 feed live video or images of the environment surrounding the user to the display 115. The one or more internal cameras 120 also track the movement of the device 110 and adjust the video or images of the environment according to the movements. Although two internal cameras 120 are depicted in FIG. 1, it will be appreciated that any suitable number of internal cameras 120 may be used (e.g., one internal camera 120).

In examples, CPU 116 overlays, on display 115, generated objects (such as instructions or other types of information) on top of the actual environment (e.g., in cases of a transparent display 15) or live video or images (e.g., from internal camera 120 or, as described below, external cameras 130) of the environment surrounding the user.

In embodiments, sensors 118 are configured to allow the user to control device 110 or interact with the live video of images of the environment (e.g., in configurations in which display 115 is not transparent and displays images/video from internal camera 120 or external camera 130), or the overlaid instructions and information from CPU 116. For example, the user may be able to interact with the overlaid instructions/information by touching device 110, typing into device 110, speaking to device 110, gesturing to device 110, or gesturing using device 110. Sensors 118 include any desired sensors, such as accelerometers to detect movement of the device 110 to respond to gesture control, touch sensors, microphones, keyboards, mice, trackpads, etc.

In examples, device 110 uses data from sensors 118 (e.g., accelerometer data) to detect movement of device 110. As discussed in further detail below, such detected movement may be used to determine whether a generated object requires updating (e.g., moved in a direction opposite to movement of device 110 so as to retain the generated object in a constant position relative to the actual environment or image displayed on display 115 or to otherwise adjust a position of the generated object). For example, a position of the generated object may be updated so that it does not entirely leave a field of view of the user (e.g., so that at least a minimum portion of the generated object remains visible), as discussed in further detail below. In other examples, data from sensors 118 (e.g., accelerometer data) may be used to adjust the live video or images of the environment displayed on the display 115 according to the movements.

In an embodiment, optional one or more external cameras 130 are incorporated to track the movement of the device 110. For example, the one or more external cameras 130 may calculate the difference in positioning of the device 110 in the field of view of each of the cameras 130, and accordingly adjust the live video or images of the environment supplied by the one or more internal cameras 120 to be displayed on the display 115.

In an embodiment, optional controller 125 is incorporated to control the device 110. The controller 125 includes input controls, such as a mouse, keyboard, touchpad, or trackpad (and/or any of those described for sensors 118), and may include movement controls, such as a joystick. In embodiments, controller 125 works in conjunction with sensors 118 or may operate independently for controlling the device 110. For example, controller 125 may be used to interact with instructions or information displayed on the display 115 via input controls (e.g., the keyboard or mouse). In examples, controller 125 is used to adjust the live video or images of the environment supplied by one or more internal cameras 120 to be displayed on the display 115 via movements of a joystick or other input control.

The number and arrangement of modules and devices shown in FIG. 1 are provided as an example. In practice, there may be additional modules and devices, fewer modules and devices, different modules and devices, or differently arranged modules and devices than those shown in FIG. 1.

Figure 2A:
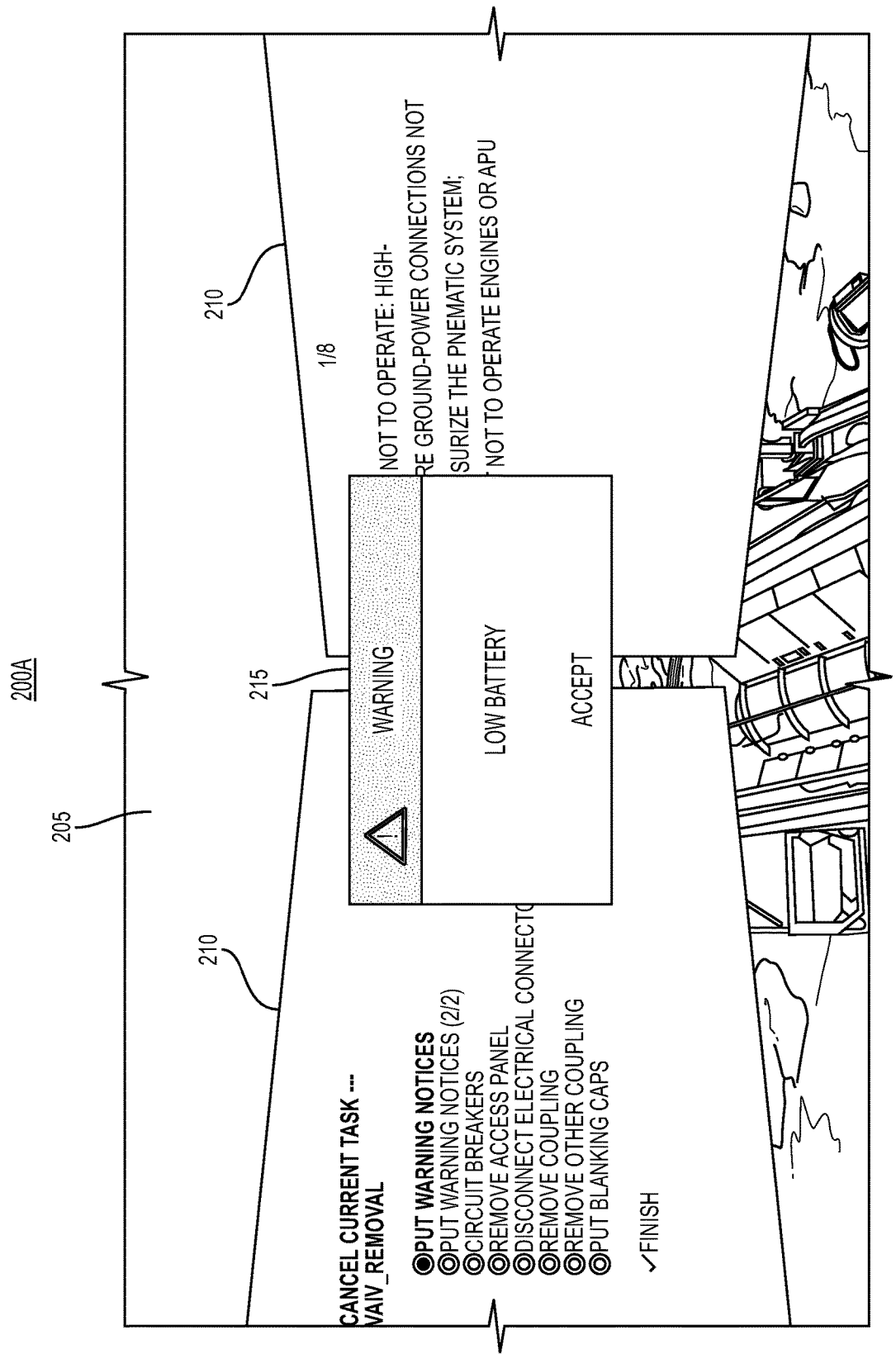
Figure 2B:
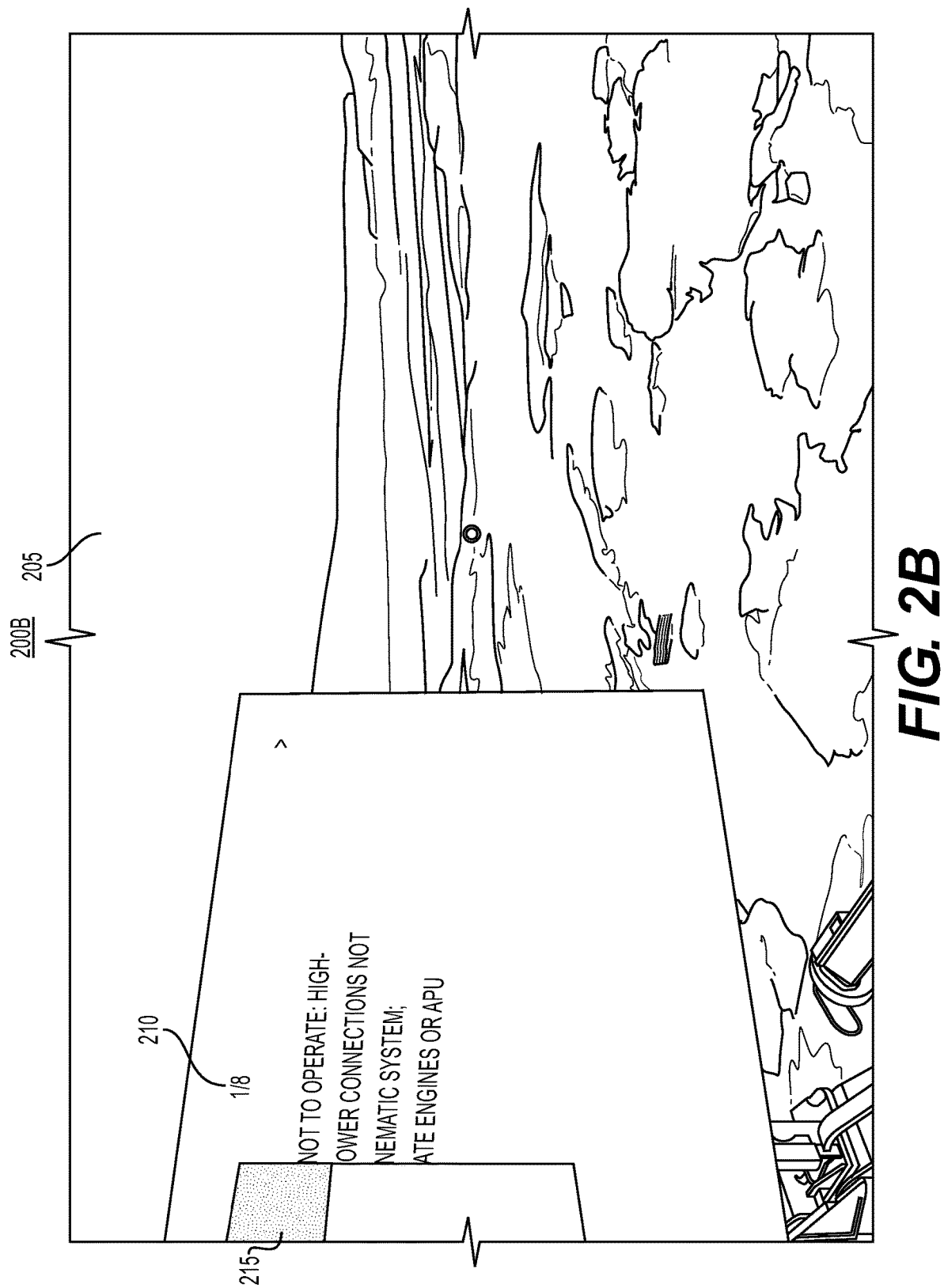

FIGS. 2A-2C depict exemplary user interfaces 200A-200C for displaying overlay screens in an AR/VR environment, according to certain aspects of the present disclosure. User interfaces 200A-200C are exemplary representations of what the user would see using the AR/VR device 110.

Interface 200A depicts the user receiving instructions and high priority information in an AR/VR environment. In embodiments (e.g., AR embodiments), interface 200A depicts an actual (real-world) environment 205 of the user. In such examples, user interface 200A may be described as having a transparent display. In alternatives (e.g., VR embodiments), user interface 200A includes live video or pictures of the surrounding environment 205 of the user. Interface 200A also includes instructions 210 displayed overlaid on top of the environment (the actual environment, live video, or picture of the surrounding environment). Although instructions 210 are referred to herein, it will be appreciated that any virtual object may be overlaid on top of the environment, including models, controls, icons, images, animations, or other objects. An overlay screen 215 displays high priority information on top of instructions 210. Although overlay screen 215 is referred to herein as an example, it will be appreciated that other types of virtual objects, such as models, controls, icons, images, animations, or other objects may be overlaid on top of instructions 210 and/or the environment to display high-priority information. The information displayed on overlay screen 215 may be higher-priority (e.g., more urgent, more operationally important, or of greater long-term value) than the instructions 210. Although overlay screen 215 is referenced herein, a screen need not be used. For example, alternatives include a 3D model, 2D model, animation, or combination thereof.

A field of view of the user interacting with interfaces 200A-200C. The field of view includes the actual environment 205 (e.g., in AR) or images/video of a simulated environment 205 (e.g., in VR) that the user views. In examples, the field of view changes as AR/VR device 110 moves. For example, where AR/VR device is a headset or glasses, as the user moves his or her head, the field of view would change with that movement. The field of view is displayed on the device (e.g., a smart glass, smart phone, tablet, or a computer screen).

As AR/VR device 110 moves, overlay screen 215 remains in a fixed position relative to environment 205 (whether actual or virtual) until the field of view of the user moves such that less than a minimum portion of overlay screen 215 is visible to the user. Overlay screen 215 remains fixed until too little of overlay screen 215—less than a minimum portion—is visible to the user within the field of view. As discussed in further detail with respect to FIGS. 2B-2C, below, upon such movement by the user, overlay screen 215 moves toward the center of the field of view of the user so that the minimum portion of overlay screen 215 remains visible and rotates the screen to be perpendicularly facing the user. The correction (moving overlay screen 215) is performed in every scene rendered if the minimum visibility criteria are not met (less than a minimum portion of overlay screen 215 is visible). Such correction to overlay screen 215 maintains overlay screen 215 (depicting high priority information) within a field of view of the user. The movement of overlay screen 215 results in overlay screen 215 "following" a user's field of view. In other words, overlay screen 215 is dragged in a direction of the user's head movement. The techniques above prevent overlay screen 215 from falling off the field of view. For example, absent such techniques, example, as a user wearing a headset AR/VR device 110 moves his or her head to the right, overlay screen 215 may fall off the left side of the field of view, absent the techniques below.

In examples, the minimum visibility criteria is configurable and may be configured according to an application being used, according to the hardware specification of the AR/VR device 110, or according to user preference. The minimum visibility criteria represent an amount of overlay screen 215 which must be visible to the user. The minimum visibility criteria may be expressed as, for example, a percentage of overlay screen 215 that is required to be visible, an absolute size of overlay screen 215 that is required to be visible, or by a key piece of information on overlay screen 215 that is required to be visible.

In the exemplary depiction, interface 200A is a default view or primary field of view for the user viewing instructions 210 of a task to be accomplished. The overlay screen 215 displaying high priority information is at the center of the user's viewing area and remains above other instructions 210 (or other depicted information) to gain the attention of the user. Overlay screen 215 is positioned above all other information in the AR/VR environment until the user dismisses or acknowledges the information (e.g., via interacting with an "Accept" button, swiping on the information, entering prescribed keystrokes, or otherwise interacting with the information of overlay 215). Until interaction with the overlay screen 215, the screen remains at least partially visible to the user. After the user interacts with the information of overlay screen 215, overlay screen 215 ceases to be displayed. Interaction with the information of overlay screen 215 may occur via, for example, sensors 118 or controller 125.

User interface 200B (FIG. 2B) is an exemplary representation of what the user sees through or from the AR/VR device 110 while continuing with the current task with a pending overlay screen 215. As discussed above for interface 2A, interface 200B includes the actual environment 205 visible through AR/VR device 10 and/or live video or pictures of the surrounding environment 205 of the user, instructions 210 displayed overlaid on top of the live video or picture of the surrounding environment, and overlay screen 215 displaying as a minimum visible portion. As depicted in 200B, the overlay screen 215 has not been dismissed or acknowledged by the user and remain at least partially visible to the user.

As shown in FIG. 200B, overlay screen 215 does not interfere with the user's other tasks. Overlay screen 215 occupies only a small portion of environment 205, allowing a user to, for example, continue with a previous task without interruption until the user desires to interact with the information of overlay screen 215. For example, the user may continue to interact with virtual objects or with the real world. In an example, the user may be performing a repair on a component (e.g., disassembling an engine) and may view the component in the actual environment (via, e.g., AR). In order to continue with the disassembly, it is undesirable to the user for overlay screen 215 to "hang" or be pinned in front of the engine. The user 215 may desire to move overlay screen 215 to the side in order to continue the task.

User interface 200C (FIG. 2C) is an exemplary representation of what the user would see from the AR/VR device 110 while continuing with the current task with a pending overlay screen 215. As discussed above with respect to interfaces 200A and 200B, interface 200C includes the actual environment 205 or live video or pictures of the surrounding environment 205 of the user, with overlay screen 215 displaying as a minimum visible portion. As depicted in 200C, the user may have moved the AR/VR device to have any instructions positioned outside of the field of view of the user; however, the overlay screen 215 has not been dismissed or acknowledged by the user and remains at least partially visible to the user.

As shown in FIGS. 2B and 2C, overlay screen 215 may occupy different positions in environment 205, depending on how the user's field of view is oriented. The positions of overlay screen 215 are merely exemplary. Other positions of overlay screen 215 may also be used to facilitate a user's ability to continue to interact with other portions of environment 205 (e.g., to complete an in-process task), while overlay screen 215 remains at least partially visible to the user to remind the user of the information on overlay screen 215 and the need to interact with overlay screen 215. Thus, interfaces 200A-200C balance a desire to continuously display high-importance information on overlay screen 215, while allowing the user to work on other tasks before interacting with the information of overlay screen 215.

As depicted by the exemplary user interface 200A-200C, overlay screen 215 is advantageously used to display important information that the user cannot interact with directly (e.g., environmental temperature or oxygen levels), display important information that may require user's reaction, display confirmation that the user is aware of the information displayed in the overlay screen (e.g., warnings), and/or enable the user freedom to choose when to react to the overlay screen (e.g., in a phone call for the user, the user may move the phone call screen outside of the primary field of view until the user is ready to answer).

Overlay screen 215 as depicted in exemplary user interfaces 200A-200C may be created by numerous sources. In one example, overlay screen 215 is created by external triggers, such as phone calls, dangerous environmental factors (e.g., low/high oxygen levels, fire hazard, etc.), important messages, or notifications generated by certain systems or individuals. In another example, overlay screen 215 is created by internal triggers of the AR/VR system, such as certain steps in manuals for warning purposes, low battery of the device, time remaining of certain events, etc. In another example, overlay screen 215 is user-generated. For example, the user may create timers, reminders, or warnings, etc. that may be displayed to the user as overlay screens.

The overlay screen 215 may be dismissed or acknowledged by a variety of methods. For example, the user may directly interact with the overlay screen (e.g., accepting a warning) or select from a list of options (e.g., accept or decline phone call). The user may also indirectly interact with the overlay screen, such as correcting an event that triggered the overlay screen (e.g., move to an area outside of the dangerous situation, or plug the AR/VR device into a power source). The user may also dismiss the overlay screen by meeting a specified amount of time.

In an example, appearance of the overlay screen 215 is configurable by the user or an operator. In an example, the minimum area of the overlay screen that is always visible is adjustable according to preferences or factors. In an example, the size, color and labels or text of the overlay screen are adjustable based on user preference.

Although FIGS. 2A-2C show an exemplary user interface, in some implementations, interfaces 200A-200C may include additional user interface elements, fewer user interface elements, different user interface elements, or differently arranged user interface elements than those depicted in FIGS. 2A-2C. As discussed above, overlay screen 215 is non-limiting. Instead of a screen, the overlay may include a model (e.g., a two-dimensional or three-dimensional model), an image, a graphic, a chart, or another type of virtual object. The user may interact with the overlay in any suitable manner so as to address or dismiss the overlay, and the overlay may behave (e.g., move to a periphery of the field of view) as described above, with respect to FIGS. 2A-2C.

Figure 3A:
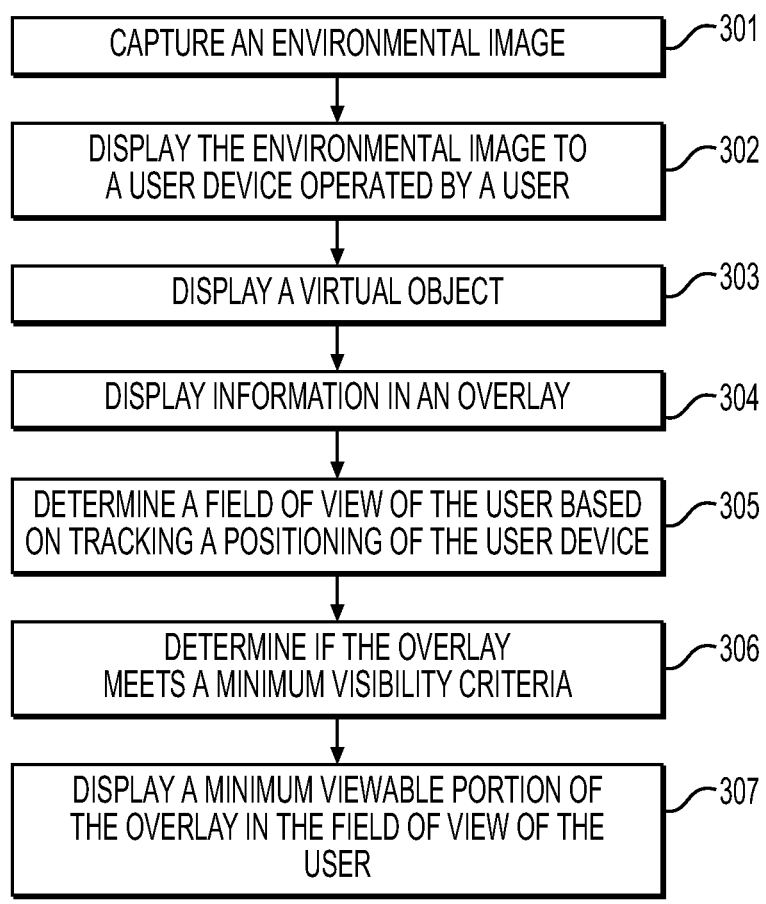
FIGS. 3A-3B depict exemplary flowcharts of a method for displaying overlay screens in AR/VR environments, according to aspects of the present disclosure.

FIG. 3A depicts an exemplary method 300 of a method for displaying overlay screens in AR/VR environments, according to certain aspects of the present disclosure. Method 300 begins at step 301 where images or video of the environment surrounding a user are captured. At step 302, the images or video of the environment are displayed to a user device operated by a user. Steps 301 and 302 are optional and may be performed in VR examples but may be omitted in AR examples where a real environment is visible to the user.

At step 303, one or more virtual objects (e.g., instructions regarding tasks to be completed) are displayed to the user on the user device. The virtual object(s) are displayed as an overlay on top of the actual environment (e.g., AR) or the image or video of the environment (e.g., VR). Step 303 may alternatively be omitted. The virtual objects displayed in step 303 may have any of the properties of instructions 210.

At step 304, information is displayed in an overlay (e.g., an overlay screen) on the user device. As discussed above, the overlay need not be an overlay screen. Information displayed may include warnings or high importance or high priority notifications. The overlay may have any of the properties of overlay screen 215.

At step 305, the field of view of the user is determined based on tracking/determining a positioning of the user device. For example if the user turns his or her head, then the field of view is adjusted based on the direction of the movement. At step 306, a determination is made to determine if the overlay meets a minimum visibility criteria based on the positioning of the user device. For example, if the user moves the field of view away from the overlay, the overlay may no longer be visible to the user on the display, thereby failing to meet a minimum visibility criteria. The minimum visibility criteria may be configured by the user or operator, as described above with respect to FIGS. 2A-2C. At step 307, upon determining that the overlay does not meet the minimum visibility criteria, then the overlay is adjusted, and a minimum viewable portion may be displayed in the field of view of the user to ensure that the overlay is at least partially visible to the user.

Figure 3B:
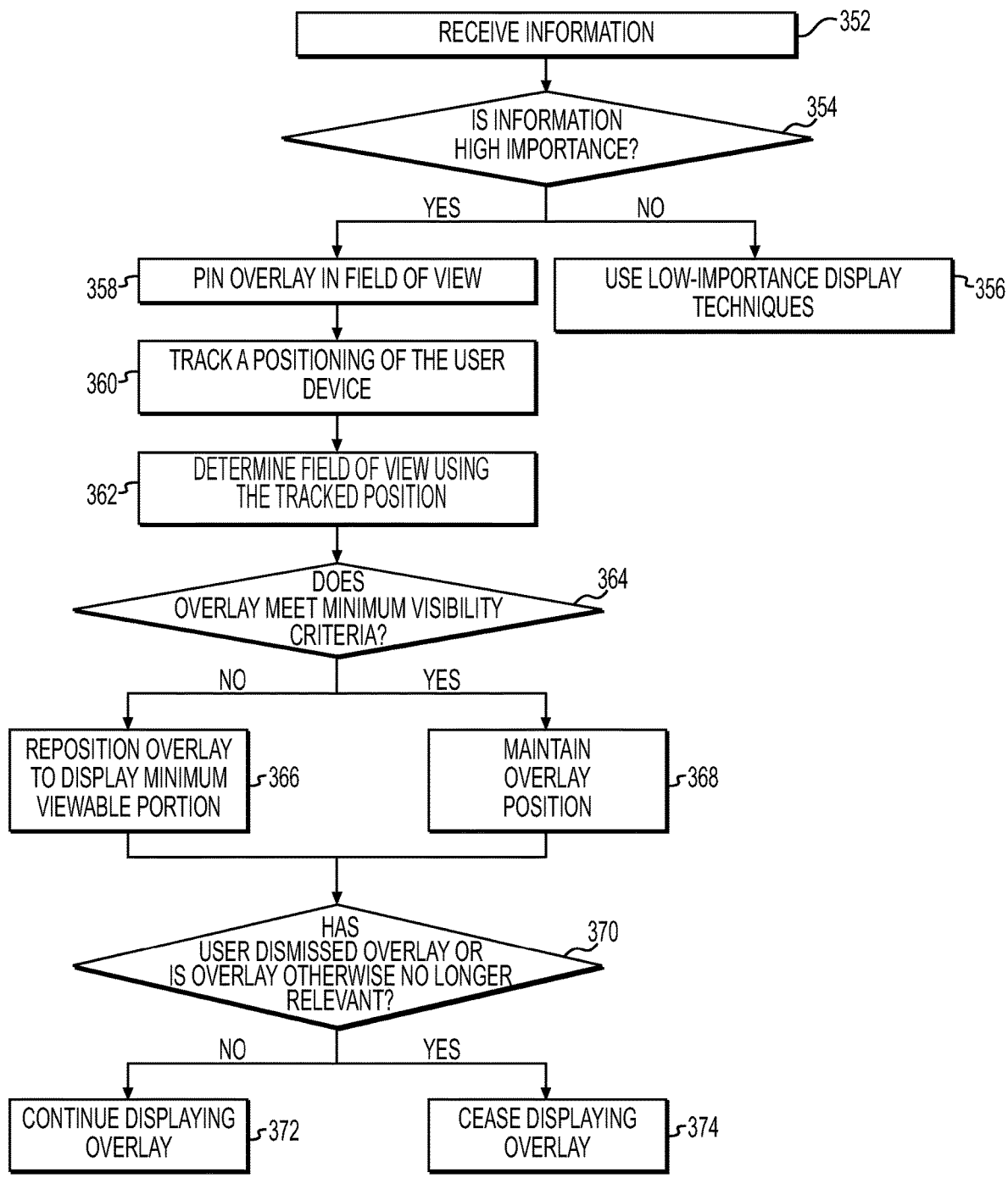

FIG. 3B depicts a further exemplary method 350. In step 352 of method 350, a processor of a system or device (such as AR/VR device 110) receives information for displaying to a user. In step 354, the processor determines whether the received information is high-importance information. If the information is not high importance, it is displayed in step 356 according to techniques for low-importance information (e.g., the received information may be displayed as instructions 210 are displayed).

If the received information is of high importance, in step 358, the information is displayed in an overlay pinned in a user's field of view. If other information (e.g., instructions 210) are displayed, the overlay is pinned atop such information. The overlay of step 358 may have any of the properties of overlay screen 215. In step 360, a positioning of the device (e.g., AR/VR device 110) is determined according to, to, for example, the mechanisms discussed above with respect to FIG. 1. In step 362, a field of view of the user is determined, using the tracked position. For example, it may be determined where the overlay is positioned relative to the field of view. In an example, a user wearing an AR headset or glasses may turn his or her head.

In step 364, it is determined whether the overlay meets minimum visibility criteria, as discussed above with respect to FIGS. 2A-2C and 3A. For example, it may be determined whether an amount of the overlay that is visible to the user exceeds a defined threshold. If, in step 366, it is determined that the minimum visibility, the overlay is repositioned (as in, for example, FIGS. 2B and 2C) to display at least the minimum viewable portion. If, in step 368, it is determined that the minimum visibility criteria are satisfied, a position of the overlay is maintained, such that the position of the overlay relative to the environment does not change.

In step 370, it may be determined whether a user has dismissed the overlay or that the overlay is otherwise no longer relevant (e.g., out of date). If the overlay has not been dismissed or rendered irrelevant, in step 372, the overlay is continued to be displayed. If the overlay is determined to have been dismissed or is otherwise not relevant, the overlay is ceased to be displayed in step 374.

Although FIGS. 3A and 3B show example blocks, in some implementations, processes 300, 350 may include additional blocks, fewer blocks, different blocks, or differently arranged blocks than those depicted in FIGS. 3a AND 3b. Additionally, or alternatively, two or more of the blocks of methods 300, 350 may be performed in parallel. Blocks of methods 300, 350 may be combine in various combinations, and some steps may be omitted.

Figure 4:
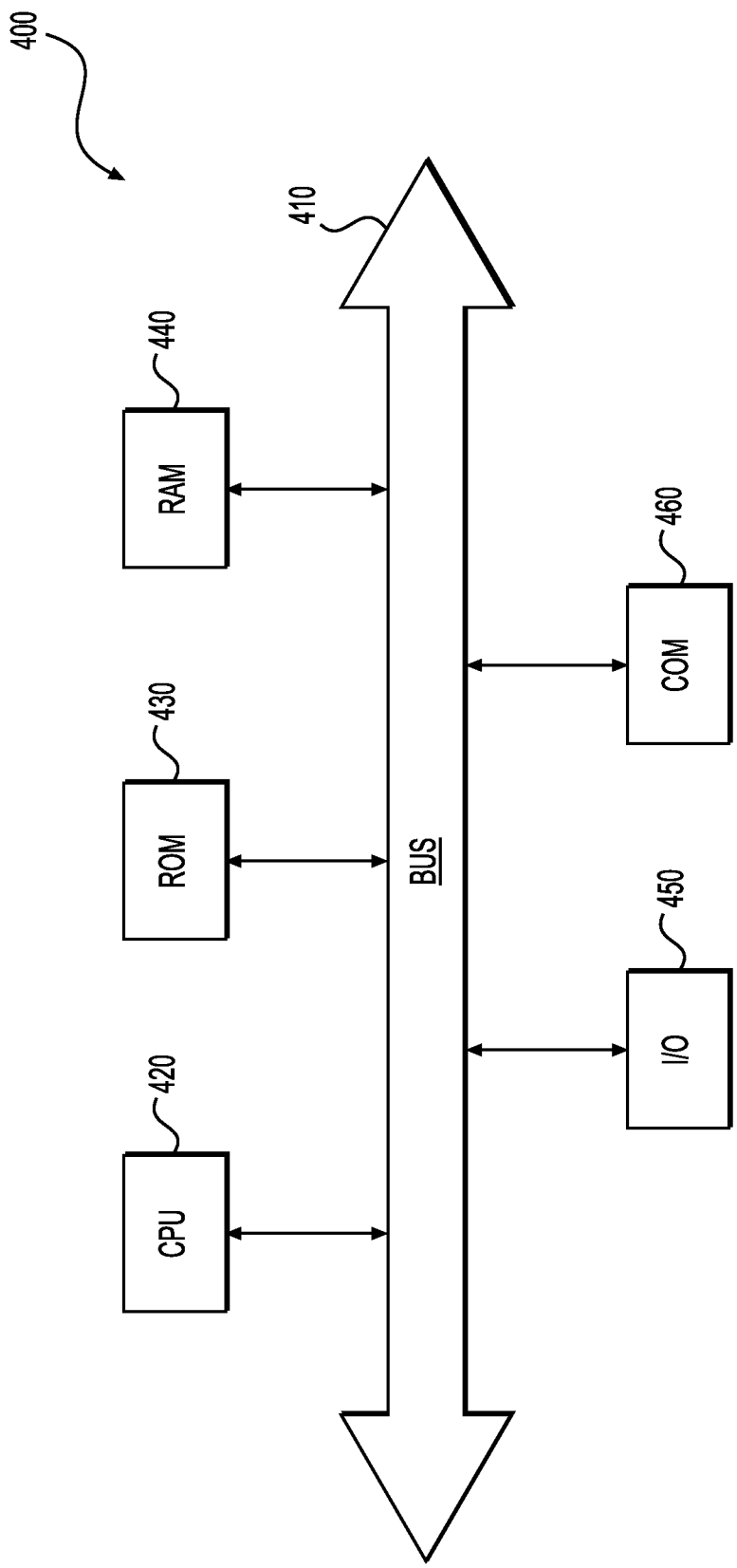
FIG. 4 depicts an exemplary computer device or system, in which embodiments of the present disclosure, or portions thereof, may be implemented.

FIG. 4 depicts a high-level functional block diagram of an exemplary computer device or system, in which embodiments of the present disclosure, or portions thereof, may be implemented, e.g., as computer-readable code. Additionally, each of the exemplary computer servers, databases, user interfaces, modules, and methods described above with respect to FIGS. 1-3 can be implemented in device 400 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-3.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-3, may be implemented using device 400. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 4, device 400 may include a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multi-processor system, such system operating alone, or in a cluster of computing devices operating in a cluster or server farm. CPU 420 may be connected to a data communication infrastructure 410, for example, a bus, message queue, network, or multi-core message-passing scheme.

Device 400 also may include a main memory 440, for example, random access memory (RAM), and also may include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 also may include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for overlay screen display, the method comprising:
    displaying, by one or more processors, information in an overlay in a fixed position relative to an environment of a user;

determining, by the one or more processors, a field of view of the user in the environment based on determining a positioning of a user device relative to the environment;

determining, by the one or more processors, that the overlay does not meet a minimum visibility criteria in the field of view of the user based on the positioning of the user device; and displaying, by the one or more processors, a minimum viewable portion of the overlay in the field of view of the user upon determining that the overlay does not meet the minimum visibility criteria, so that at least the minimum viewable portion of the overlay is visible in the field of view of the user.

2. The computer-implemented method of claim 1, the method further comprising ceasing to display the overlay upon the user interacting with the overlay.

3. The computer-implemented method of claim 2, wherein the interaction of the user with the overlay includes using a sensor or a controller to dismiss or accept the information.

4. The computer-implemented method of claim 1, wherein the minimum viewable portion of the overlay enables the user to perform another task before interacting with the overlay screen.

5. The computer-implemented method of claim 4, wherein the minimum viewable portion of the overlay allows the user to view at least one of an environmental image displayed by the processor, a real-world object, or a virtual object.

6. The computer-implemented method of claim 1, wherein the field of view is a first field of view and the positioning is a first positioning, the method further comprising:
determining, by the one or more processors, a second field of view of the user based on determining a second positioning of the user device, wherein the second field of view differs from the first field of view and the second positioning differs from the first positioning;
determining, by the one or more processors, whether the overlay meets the minimum visibility criteria based on the second positioning of the user device; and
displaying, by the one or more processors, the minimum viewable portion of the overlay in the second field of view of the user upon determining that the overlay screen does not meet the minimum visibility criteria.

7. The computer-implemented method of claim 1, the method further comprising displaying a virtual object, and wherein the overlay is displayed on top of the virtual object.

8. A computer-implemented system for overlay screen display, the computer-implemented system comprising:
a memory having processor-readable instructions stored therein; and
one or more processors configured to access the memory and execute the processor-readable instructions, which when executed by the one or more processors configures the one or more processors to perform a method including:
displaying, by the one or more processors, information in an overlay in a fixed position relative to an environment of a user;
determining, by the one or more processors, a field of view of the user in the environment based on determining a positioning of a user device relative to the environment;
determining, by the one or more processors, that the overlay does not meet a minimum visibility criteria in the field of view of the user based on the positioning of the user device; and
displaying, by the one or more processors, a minimum viewable portion of the overlay in the field of view of the user upon determining that the overlay does not meet the minimum visibility criteria, so that at least the minimum viewable portion of the overlay is visible in the field of view of the user.

9. The computer-implemented system of claim 8, the method further comprising ceasing to display the overlay upon the user interacting with the overlay screen.

10. The computer-implemented system of claim 9, wherein the interacting with the overlay includes using a sensor or a controller to dismiss or accept the information.

11. The computer-implemented system of claim 8, wherein the minimum viewable portion of the overlay enables the user to perform another task before interacting with the overlay.

12. The computer-implemented system of claim 11, wherein the minimum viewable portion of the screen allows the user to view at least one of an environmental image displayed by the processor, a real-world object, or a virtual object.

13. The computer-implemented system of claim 8, wherein the field of view is a first field of view and the positioning is a first positioning, the method further comprising:
determining, by the one or more processors, a second field of view of the user based on determining a second positioning of the user device, wherein the second field of view differs from the first field of view and the second positioning differs from the first positioning;
determining, by the one or more processors, whether the overlay meets the minimum visibility criteria based on the second positioning of the user device; and
displaying, by the one or more processors, the minimum viewable portion of the overlay in the second field of view of the user upon determining that the overlay does not meet the minimum visibility criteria.

14. The computer-implemented system of claim 8, wherein the method further comprises displaying a virtual object, and wherein the overlay is displayed on top of the virtual object.

15. A non-transitory computer-readable medium containing instructions for overlay screen display, the non-transitory computer-readable medium storing instructions that, when executed by one or more processors, may configure the one or more processors to perform a method comprising:
displaying, by the one or more processors, information in an overlay in a fixed position relative to an environment of a user;
determining, by the one or more processors, a field of view of the user in the environment based on determining a positioning of a user device relative to the environment;
determining, by the one or more processors, that the overlay does not meet a minimum visibility criteria in the field of view of the user based on the positioning of the user device; and
displaying, by the one or more processors, a minimum viewable portion of the overlay in the field of view of the user upon determining that the overlay does not meet the minimum visibility criteria, so that at least the minimum viewable portion of the overlay is visible in the field of view of the user.

16. The non-transitory computer-readable medium of claim 15, the method further comprising ceasing to display the overlay upon the user interacting with the overlay.

17. The non-transitory computer-readable medium of claim 16, wherein the interacting with the overlay includes using a sensor or a controller to dismiss or accept the information.

18. The non-transitory computer-readable medium of claim 15, wherein the minimum viewable portion of the overlay enables the user to perform another task before interacting with the overlay.

19. The non-transitory computer-readable medium of claim 18, wherein the minimum viewable portion of the overlay allows the user to view at least one of an environmental image displayed by the processor, a real-world object, or a virtual object.

20. The non-transitory computer-readable medium of claim 15, wherein the field of view is a first field of view and the positioning is a first positioning, the method further comprising:
  determining, by the one or more processors, a second field of view of the user based on determining a second positioning of the user device, wherein the second field of view differs from the first field of view and the second positioning differs from the first positioning;
  determining, by the one or more processors, whether the overlay meets the minimum visibility criteria based on the second positioning of the user device; and
  displaying, by the one or more processors, the minimum viewable portion of the overlay in the second field of view of the user upon determining that the overlay does not meet the minimum visibility criteria.

\* \* \* \* \*